H. W. LUNCEFORD.
HYDRANT.
APPLICATION FILED MAY 6, 1909.

947,184.

Patented Jan. 18, 1910.

Witnesses:
Lute S. Alter
Mary L. Goodwin

Inventor:
Henry W. Lunceford
By Brooks & Liddens
Attorneys.

UNITED STATES PATENT OFFICE.

HENRY W. LUNCEFORD, OF LOS ANGELES, CALIFORNIA, ASSIGNOR OF ONE-HALF TO WESTERN PIPE AND STEEL CO., OF LOS ANGELES, CALIFORNIA, A CORPORATION OF CALIFORNIA.

HYDRANT.

947,184.  Specification of Letters Patent.  Patented Jan. 18, 1910.

Application filed May 6, 1909. Serial No. 494,468.

*To all whom it may concern:*

Be it known that I, HENRY W. LUNCE-FORD, a citizen of the United States of America, residing at Los Angeles, in the county of Los Angeles, State of California, have invented a certain new and useful Hydrant; and I do hereby declare the following to be a full, clear, and exact description of the invention, such as will enable others skilled in the art to which it appertains to make and use the same.

This invention relates to a hydrant, particularly to one adapted for use for irrigation purposes.

One object of the invention is to provide a device of this class in which the head can be rotated to bring the outlet thereof into position for discharge of water in any desired direction.

Another object of the invention is to provide a construction for a hydrant in which the water is normally shut off from the rotating head, thus obviating the necessity for a watertight joint between the head and the stationary part of the hydrant.

A further object of the invention is to so construct the hydrant that the head may be rotated either when the water is flowing from the hydrant or when it is shut off.

A still further object of the invention is to provide a hydrant that may be cheaply constructed by reason of expensive machining operations being eliminated.

Other objects and the advantages of the invention will be apparent to those skilled in the art, from a consideration of one form of construction in which it may be embodied, as illustrated in the accompanying drawings, in which—

Figure 1:
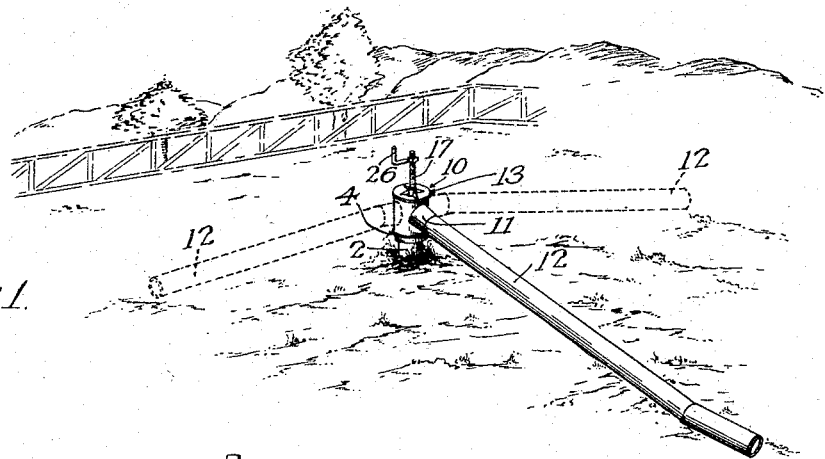
Figure 2:
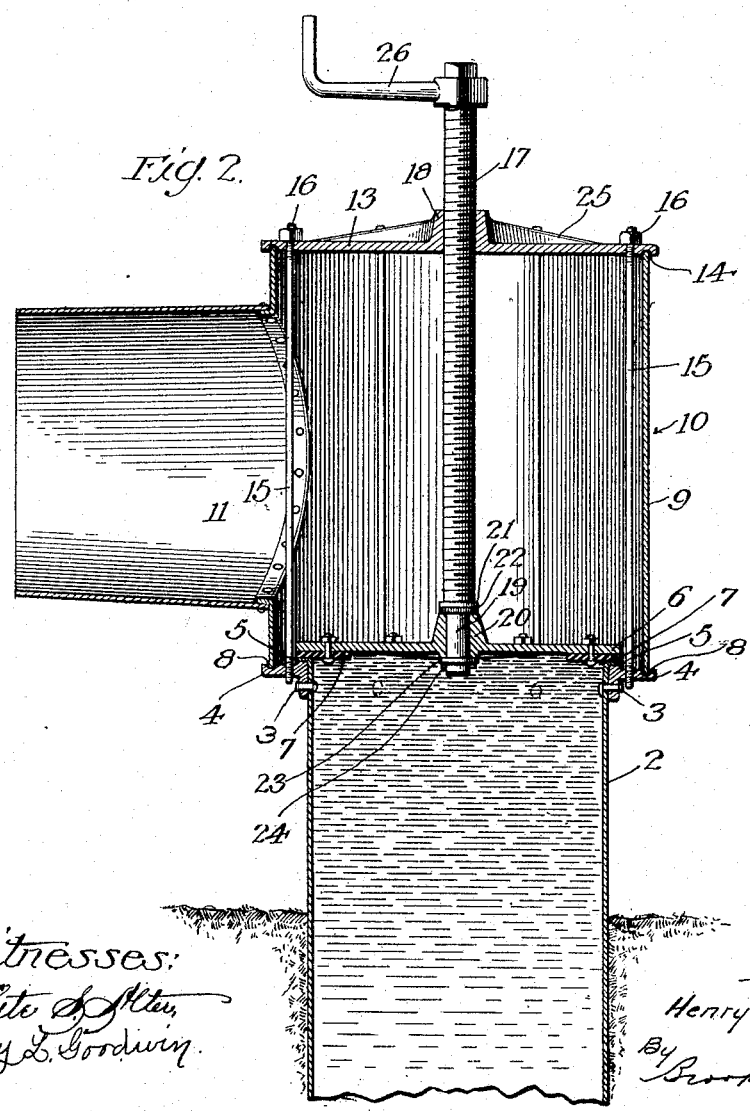

Figure 1 is a perspective of the invention, and Fig. 2 is a vertical central section.

The standpipe 2 has secured to it, preferably by rivets 3, a ring 4 at its upper portion, the upper end of the standpipe being outwardly flanged to form a valve-seat 5 on which rests valve 6, having a face 7 of suitable material, such as leather. Ring 4 has an annular groove 8 which receives the lower edge of the tubular portion 9 of the rotating head 10. This head is provided with an outlet 11, to which may be connected pipes 12 whereby water may be conducted to any place desired.

The upper part of head 10 is closed by plate 13, provided with an annular groove 14 which receives the upper edge of the tubular portion 9. Bolts 15 are threaded into ring 4 and pass through holes in plate 13 and have nuts 16 screwed thereon above said plate. Valve 6 is held to its seat by screw 17 threaded through boss 18 in the center of plate 13. The lower end of screw 17 may have a reduced portion 19 passing through boss 20 in valve 6. On said reduced portion above boss 20 are placed a metal washer 21 and a washer 22, preferably of leather, the latter being disposed next to the boss 20. On the lower side of the valve upon the reduced portion is placed a washer 23, and a split pin 24 passes through the bottom of said portion 19 to hold washer 23 in position. Plate 13 is strengthened by ribs 25 to resist the thrust of screw 17. The upper end of screw 17 is provided with a handle 26 whereby it may be turned.

The mode of operation of the invention may be as follows: After loosening nuts 16 slightly, head 10 may be rotated to bring the outlet 11 in position to discharge water in the direction desired. The slackening of nuts 16 allows plate 13 to rise slightly, thus opening the valve 6. Screw 17 may now be turned, if desired, to close the valve until pipes 12 are connected to the hydrant and arranged over the ground as may be desired. Screw 17 may then be operated to raise valve 6, allowing water to flow through outlet 11 and pipes 12, and at the same time nuts 16 may be tightened to prevent leakage of water between tubular portion 9 and ring 4. Head 10 may be turned without closing valve 6, as will be readily understood.

While one form of apparatus in which the invention may be embodied has been illustrated and described, it is obvious that various modifications and changes may be made, and the right is reserved to all modifications and changes which do not depart from the spirit and scope of the invention.

I claim:

1. In a hydrant, the combination of a standpipe with a valve therefor, a plate connected movably to said standpipe, and a member provided with an outlet and arranged between said standpipe and plate, said standpipe and plate formed and arranged to permit rotation of the member therebetween.

2. In a hydrant, the combination of a standpipe with a valve therefor, a ring affixed to said standpipe, a plate connected to said ring, a screw threaded in said plate and connected with said valve, and a tubular member movably arranged between said ring and said plate.

3. In a hydrant, the combination of a standpipe with a valve therefor, a plate connected to said standpipe, a screw threaded in said plate and rotatably connected with said valve, and a member provided with an outlet and arranged between said plate and said standpipe, said member rotatable relatively to said standpipe.

4. In a hydrant, the combination of a standpipe, with a valve therefor, a ring provided with a groove and affixed to said standpipe, a plate provided with a groove, bolts passing through said plate and threaded in said ring, a tubular portion of a rotating head having its ends arranged in said grooves, and a screw threaded in said plate and rotatively connected with said valve.

In testimony whereof, I have signed my name to this specification in the presence of two subscribing witnesses at Los Angeles county of Los Angeles, State of California, this 29th day of April A. D. 1909.

HENRY W. LUNCEFORD.

Witnesses:
ELIZABETH KENDRICK,
LEITER S. ALTER.